H. LUCHS.

Assignor to D. E. PARIS.

Fluting-Machine.

No. 8,338. Reissued July 16, 1878.

Witnesses:
Donn S. Tutchell.
S. M. Madden.

Inventor:
Hannah Luchs,
Assr. to D. E. Paris.
By Dodgerson
Her Attys.

N. PETERS, PHOTO-LITHOGRAPHER, WASHINGTON, D. C.

UNITED STATES PATENT OFFICE.

HANNAH LUCHS, OF WASHINGTON, DISTRICT OF COLUMBIA, ASSIGNOR TO DANIEL E. PARIS, OF WEST TROY, NEW YORK.

IMPROVEMENT IN FLUTING-MACHINES.

Specification forming part of Letters Patent No. 96,820, dated November 16, 1869; Reissue No. 8,338, dated July 16, 1878; application filed July 3, 1878.

*To all whom it may concern:*

Be it known that I, HANNAH LUCHS, of the city of Washington, in the District of Columbia, have invented a new and useful Improvement in Fluting-Machines; and I do hereby declare that the following is a full and exact description thereof, reference being had to the accompanying drawings, and to the letters of reference marked thereon.

The invention consists in the combination of a corrugated bed, A, and a removable corrugated roller capable of moving to and fro therein, and in providing said roller with an internal heating-iron, having detachable handles, for the purpose of heating the same.

Figure 1:
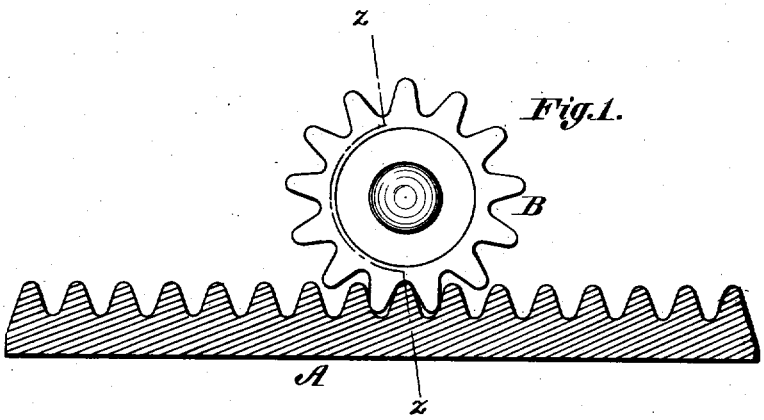
Figure 2:
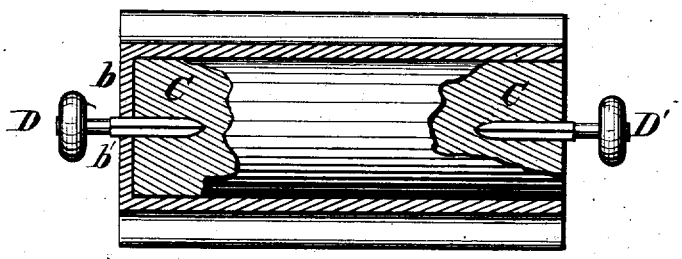

In the drawings, Figure 1 is a side elevation of the base and corrugated roller. Fig. 2 is a longitudinal sectional view of the outer cylinder, and partially a sectional view of the inner cylinder, as denoted by the line *z z* in Fig. 1.

A represents a metallic corrugated bed, whereon is placed the article, or that portion of the article, which is to be fluted. B represents a metallic corrugated roller, having a longitudinal central aperture therein, a few lines smaller than the diameter of the roller, for the reception of the heater C, one end of said roller, or the one opposite the aperture for the reception of the heater aforesaid, being closed, as shown at *b*, the better to retain and adjust the heater in position and prevent it from being pushed through the roller. Said roller is also provided at *b'* with a quadrilateral socket for the reception of one of its handles, which handle projects through it into the heater C.

C represents the heater, which is inserted in the corrugated roller aforesaid, it being slightly smaller than the latter to allow for its expansion when heated.

The roller is provided with the aperture therein for the reception of the metallic heater, in order that when the character of the fire is such that the corrugated roller would probably become smoked or soiled in the process of heating it, which would soil the article when being fluted, the heater may be withdrawn from the roller, and first heated and afterward inserted therein, without the possibility of soiling the article in the process of fluting. Said heater is provided at each lateral end with a small socket for the reception of the shanks of the handles of the roller aforesaid.

D and D' represent the handles of the corrugated roller, which handles are provided with quadilateral shanks. The shank of the former, D, projects through a lateral aperture in the roller, and fits into a similar-shaped socket provided in the heater, as shown. The journals of these handles are round at the knob, and rotate freely within the latter.

It will be observed that the handles D and D' are peculiarly designed, not only for removing the heater C, but for rotating the corrugated roller, which latter obviates the employment of a crank.

The usefulness of this invention over others is obvious. The flat bed may be heated by laying it on the stove, or in any other desirable way, and thus the heater within the roller may be entirely dispensed with. This form of fluting-machine has other advantages over the other old style of double-cylinder rollers, inasmuch as it is cheaper, more easily heated, and less liable to get out of order, and it enables the operator to use any length of elongated corrugations, as shown in Fig. 2, inasmuch as the corresponding piece that works therein or thereon is cylindrical, and the one may pass over the other in any desired rapidity and in any desired length or size. The fact that either of these corrugated surfaces may be heated independently of the other, and that the facilities for heating them in families may vary so much that only one way of heating might not be convenient, greatly increases the usefulness of this device.

I do not claim the hollow cylinder for the reception of the heater, save in its peculiar adaptation to the handles and corrugated rollers aforesaid, as I am aware that said features have hitherto been patented; but, Having described my invention, what I do claim is—

1. A fluting device consisting of a flat corrugated bed-plate and a revolving corrugated roller, having a heating-core.

2. A fluting device consisting of a flat corrugated bed-plate and a revolving corrugated roller, open at one end to admit a heating-core, constructed as herein shown and described.

3. A fluting device consisting of a flat corrugated bed, adapted to be heated by contact with a stove-top, and a revolving roller, capable also of being heated by a core, substantially as described.

4. The combination and arrangement of the adjustable handles D and D′, the heater C, and corrugated roller B of a fluting-machine, substantially as and for the purpose described.

HANNAH LUCHS.

Witnesses:

LEOPOLD LUCHS,
J. W. PILLINGS.